(12) United States Patent
Zhang

(10) Patent No.: US 11,873,252 B2
(45) Date of Patent: Jan. 16, 2024

(54) BATH OR KITCHEN PRODUCTS MADE FROM MAGNESIUM OXIDE MATERIALS

(71) Applicant: Festival Neo Corporation, Montclair, CA (US)

(72) Inventor: Yangdong Zhang, Dongguan (CN)

(73) Assignee: Festival Neo Corporation, Montclair, CA (US)

( * ) Notice: Subject to any disclaimer, the term of this patent is extended or adjusted under 35 U.S.C. 154(b) by 209 days.

(21) Appl. No.: 17/483,763

(22) Filed: Sep. 23, 2021

(65) Prior Publication Data

US 2023/0097264 A1     Mar. 30, 2023

(51) Int. Cl.
| | | |
|---|---|---|
| *C04B 14/04* | (2006.01) | |
| *C04B 18/08* | (2006.01) | |
| *C04B 28/32* | (2006.01) | |
| *C04B 41/00* | (2006.01) | |
| *C04B 111/54* | (2006.01) | |

(52) U.S. Cl.
CPC ............ *C04B 28/32* (2013.01); *C04B 14/042* (2013.01); *C04B 18/08* (2013.01); *C04B 41/009* (2013.01); *C04B 2111/54* (2013.01); Y02W 30/90 (2015.05)

(58) Field of Classification Search
CPC ....... C04B 28/32; C04B 14/042; C04B 18/08; C04B 41/009; C04B 2111/54; C04B 14/04; C04B 41/00; C04B 28/30; C04B 40/00; C04B 20/0048; C04B 22/04; Y02W 30/91

See application file for complete search history.

(56) References Cited

FOREIGN PATENT DOCUMENTS

| CN | 1049838 A | * | 3/1991 | |
| CN | 106904920 A | * | 6/2017 | ........... C04B 28/105 |
| CN | 108203291 A | * | 6/2018 | |
| CN | 108238777 A | * | 7/2018 | ........... C04B 14/383 |
| CN | 110054471 A | * | 7/2019 | ............. C04B 28/32 |

OTHER PUBLICATIONS

CN-110054471-A, machine translation (Year: 2019).*
Ecplaza Light burned magnesium oxide powder [retrieved from the internet at Jun. 13, 2023 from <URL:https://www.ecplaza.net/products/light-burned-magnesium-oxide-powder_2816141>] (Year: 2013).*
CN-108238777-A, machine translation (Year: 2018).*
CN-1049838-A, machine translation (Year: 1991).*
CN-106904920-A, machine translation (Year: 2017).*
CN-108203291-A, machine translation (Year: 2018).*

* cited by examiner

*Primary Examiner* — Anthony J Green
*Assistant Examiner* — Marites A Guino-O Uzzle
(74) *Attorney, Agent, or Firm* — Jen-Feng Lee, Esq.

(57) ABSTRACT

Present invention teaches using MGO (magnesium oxide) materials, with the formula of the ingredients as disclosed to create a paste of slurry mixture. A molding and curing process is done by placing a layer of alkaline fiber in a mold with repeated application of the slurry mixture. Additional surface treatment, after hardening/curing, can be done to create surface decorative features, using environmentally friendly water-based coating, to suit clients' specification.

4 Claims, No Drawings

BATH OR KITCHEN PRODUCTS MADE FROM MAGNESIUM OXIDE MATERIALS

FIELD AND BACKGROUND OF THE INVENTION

Kitchen sinks, bath vanity pieces and other home interior products can be made from different materials. Porcelain is a popular choice for making bath vanity pieces. Bricks or concrete can be used to make fireplace mantels or fire pits.

The present invention uses MGO (Magnesium Oxide) materials to make the bath, kitchen or similar household products will result in a simpler and more cost-effective product choice than products made based upon the popular porcelain or other materials.

Some concrete, such as Portland concrete, can also serve as the base materials for making the kitchen/bath furniture. However, the subsequent shaping and surface treatment are relatively difficult and costly.

Because of its acid buffering ability and associated efficacy in stabilizing dissolved heavy metal species, magnesium oxide (MGO) is widely utilized in the groundwater remedial work, sewage treatment, water supply treatment, ozone pollution treatment, as well as waste management industries.

Due to MgO's superior buffering capability, cost effectiveness, and ease/safety of handling, it is commonly known as the most efficient metals stability compound when contrasted to Portland cement, lime, blast furnace dust products, electricity generation byproducts, and other commercial technologies.

Based upon such state of prior art, the invention discloses and teaches a formula of using MGO materials to make a slurry mixture, followed by a molding piece to shape the form for the desired bath, kitchen or other interior furniture pieces. Further service treatment, including decorative patterns and coloring can be done based upon client's preferences. Furthermore, furniture pieces made by the MgO materials stated herein have good heat-resistant, tire- and water-proof characteristics that are suitable for modern home livings.

SUMMARY OF THE INVENTION

The invention relates to a bathroom, kitchen or other household product made primarily from magnesium oxide materials by the weight ratio of: 20-30% brine (magnesium chloride water), 55-70% magnesium oxide powder, 1-5% fiber, 1-5% fly ash, 2-6% silicon powder, and 2-6% talc. The mixture made in the ratio stated herein will be referred to as the slurry mixture.

An exemplary specific ratio of the materials would be: 25% brine (magnesium chloride water), 62% magnesium oxide powder, 2% fiber, 2% fly ash, 5% silicon powder, and 4% talc, adding up to be 100%. But some variations of the materials, as long as ratios are within the range stated, can work just as well.

Such slurry mixture can be stirred evenly and stored in barrels for subsequent use/application, and or transportation to a different location for use/application.

Molding process then follows the mixing.

A molding and curing process is done by placing a layer of alkaline fiber into the inner space of a mold piece, as selected and chosen, and apply the prepared paste of the slurry mixture to the alkaline fiber, so that the paste can be penetrated through the layer of alkaline fiber at least two times.

Preferably, the penetration of the slurry mixture as applied to the alkaline fiber is done three times.

After removing the mold piece, the hardened slurry mixture, in the shape of the mold, can then be further worked on for additional surface treatment.

Prior to additional surface treatment, the outside surface of the cured slurry mixture is cleaned and polished. Preferably, 48 hours after removing the mold, additional surface treatment can be done to add color or any decorative patterns to the outside surface of the cured slurry mixture based upon clients' need or specification.

DETAILED DESCRIPTION OF THE PREFERRED EMBODIMENT

The present invention teaches to make furniture pieces, including cabinet pieces for bathrooms or kitchens, or even fire places, using magnesium oxide materials.

Such use of magnesium oxide materials based upon the formula disclosed herein is simple, inexpensive and easy to adapt to different uses for interior applications around the house.

The primary magnesium oxide slurry mixture is made by the ingredients stated herein, by the weight ratio of:
20-30% brine (magnesium chloride water),
55-70% magnesium oxide powder,
1-5% fiber,
1-5% fly ash,
2-6% silicon powder, and
2-6% talc.

An exemplary specific ratio of the materials would be:
25% brine (magnesium chloride water), 62% magnesium oxide powder, 2% fiber, 2% fly ash, 5% silicon powder, and 4% talc, adding up to be 100%. As long as the ratio of the materials is conforming as stated, some variations of the materials can work just as well.

After the slurry mixture is done, stir the material uniformly to a paste form that will be ready for application.

Such slurry mixture can be stored in barrels for further stirring and subsequent use/application, or for transportation to a different location for use/application.

A molding process is done by placing a layer of alkaline fiber into the inner space of a mold piece, as selected and chosen, and apply the prepared paste of the slurry mixture to the alkaline fiber, so that the paste can be penetrated through the layer of alkaline fiber.

Such penetration of slurry mixture to the layer of alkaline fiber is done at least twice. Preferably, the penetration of the slurry mixture applying to the alkaline fiber is done three times.

After at least an hour, the slurry mixture will harden and cure in a shape as defined by the mold. Remove the mold, the hardened slurry mixture, being shaped by the mold, can then be further worked on for additional surface treatment.

Prior to additional surface treatment, the outside surface of the cured slurry mixture is cleaned and polished. Preferably, 48 hours after removing the mold, additional surface treatment can be done to add color or any decorative patterns to the outside surface of the cured slurry mixture based upon clients' need or specification.

The surface treatment can further include the use of water-based coating or paint to create the desired decorate patterns as intended by clients' need; the water-based coating works well with the MGO material and is also an environmentally friendly choice.

The bath or kitchen pieces so made will have higher temperature resistance, fire resistance and water resistance.

Even if the products are discarded, broken or reaching end of like, the materials are more environmentally friendly with a shorter decomposition period, conducive to the elimination of pollution as compared to other materials used to make the same type of bath or kitchen furniture products.

The MGO materials and process disclosed herein are not limited to kitchen or bathroom. They can be used to make fireplace mantels, bath tubs, counter tops, fire pits, etc.

The foregoing disclosure of preferred embodiments for this invention has been presented for purposes of illustrating the substance of the invention. It is not intended to be exhaustive or to limit the invention to the precise form disclosed. Variations and additional embodiments are possible in light of the above teachings, and thereby enable one of ordinary skill in the art to fully utilize the invention.

All such modifications and variations are within the scope of the invention as determined by the appended claims when interpreted in accordance with the breadth to which they are fairly, legally, and equitably entitled.

The invention claimed is:

1. Kitchen or bathroom product using magnesium oxide material, comprising, a slurry mixture made by weight ratio of:

20-30% brine (magnesium chloride water),
55-70% magnesium oxide powder,
1-5% fiber,
1-5% fly ash,
2-6% silicon powder, and
2-6% talc, wherein said slurry mixture is applied to a layer of alkaline fiber for penetration and such application and penetration is done at least two times to reach a hardened and cured state for any desired shape.

2. The product of claim 1, wherein the slurry mixture application and penetration onto the layer of alkaline fiber is done preferably three times to reach a hardened and cured state for any designed shape.

3. The product of claim 1, wherein additional molding piece is added during the hardening and curing stage to further configure the slurry mixture into a desired shape set by the mold.

4. The product of claim 3, wherein further surface cleaning is performed and at least a layer of color coating is added to the outside surface of the hardened and cured piece after the mold is removed.

* * * * *